No. 848,522. PATENTED MAR. 26, 1907.
J. N. WHITNER.
WIND OR WATER POWER WHEEL.
APPLICATION FILED MAY 31, 1906.
2 SHEETS—SHEET 1.
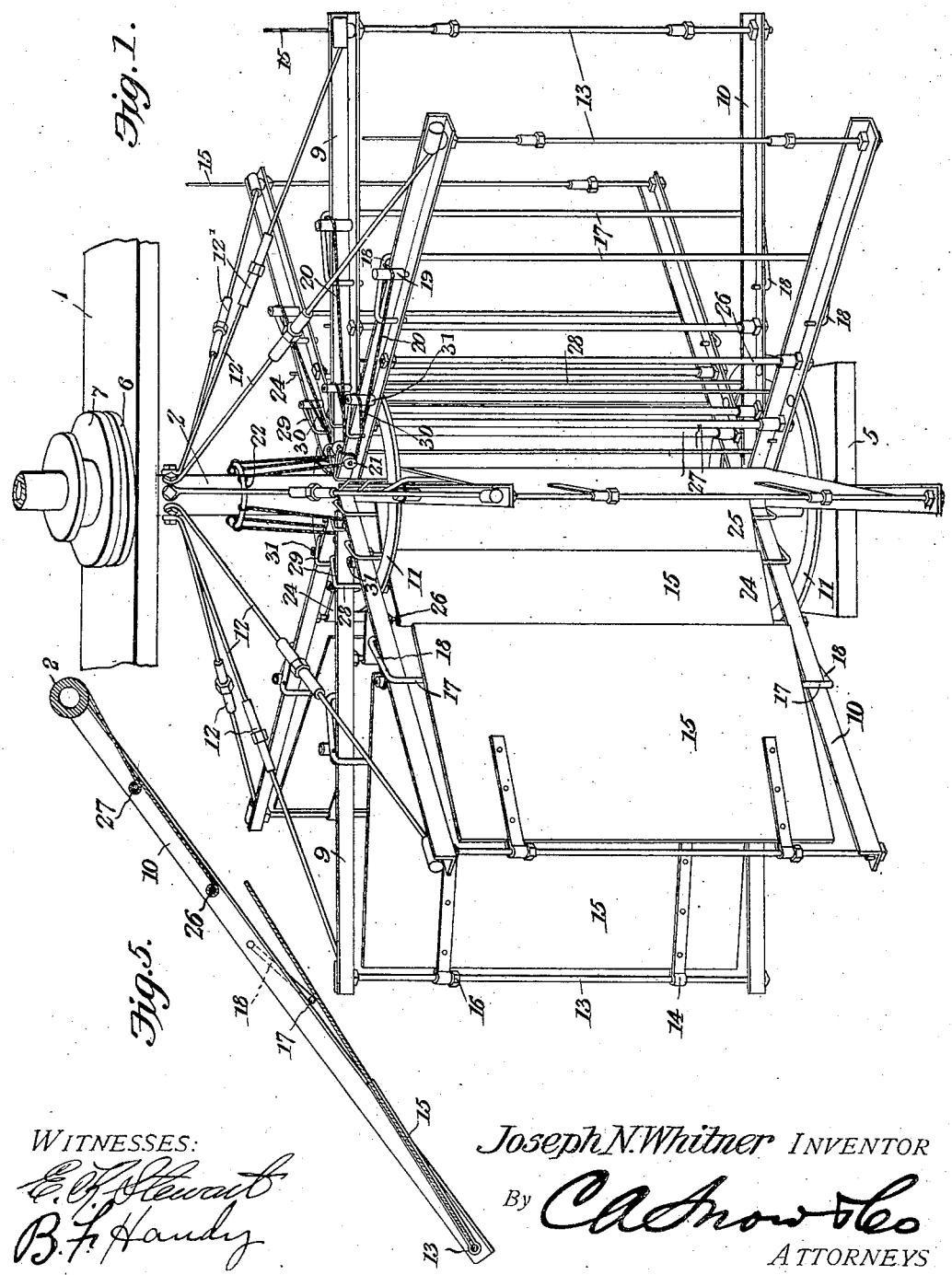
WITNESSES:
E. F. Stewart
B. F. Handy
Joseph N. Whitner INVENTOR
By C. A. Snow & Co
ATTORNEYS No. 848,522.  
PATENTED MAR. 26, 1907.  
J. N. WHITNER.  
WIND OR WATER POWER WHEEL.  
APPLICATION FILED MAY 31, 1906.  
2 SHEETS—SHEET 2.
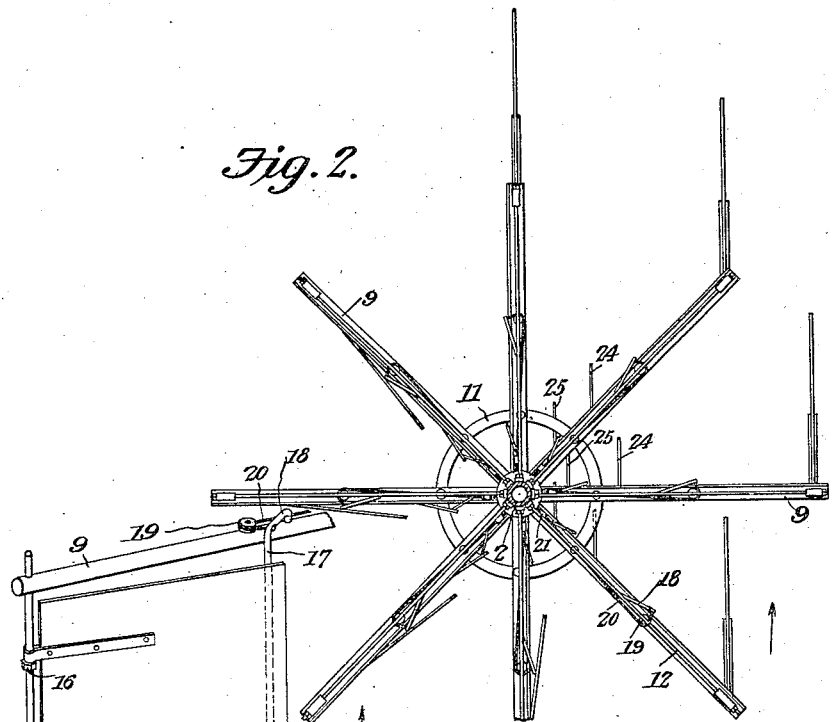
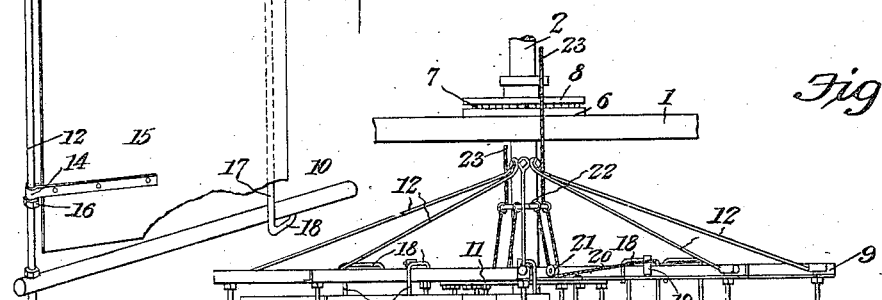
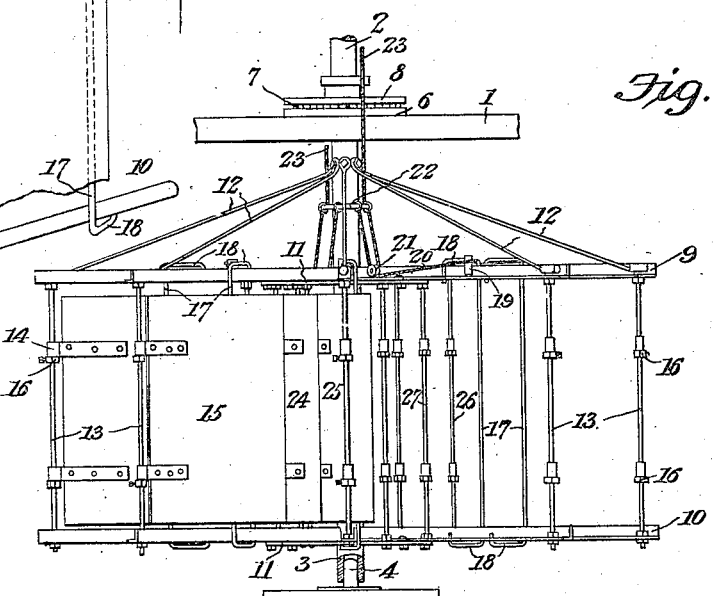
WITNESSES:  
Joseph N. Whitner INVENTOR  
By  
ATTORNEYS

UNITED STATES PATENT OFFICE.

JOSEPH N. WHITNER, OF SANFORD, FLORIDA.

WIND OR WATER POWER WHEEL.

No. 848,522.  Specification of Letters Patent.  Patented March 26, 1907.

Application filed May 31, 1906. Serial No. 319,567.

*To all whom it may concern:*

Be it known that I, JOSEPH N. WHITNER, a citizen of the United States, residing at Sanford, in the county of Orange and State of Florida, have invented a new and useful Wind or Water Power Wheel, of which the following is a specification.

This invention relates to power-wheels adapted to be operated by either air or water, although it is particularly designed for use in streams.

The object of the invention is to provide a wheel having wings or blades movably connected to it and so mounted as to present their faces to the current while moving therewith and to automatically feather while moving against the current.

A still further object is to provide a wheel capable of utilizing wings or blades of considerable extent and which may be constantly submerged.

Another object is to provide mechanism whereby all of the wings may be simultaneously unlocked, so as to bring the wheel to a stop.

With the above and other objects in view the invention consists of an upright shaft mounted in suitable bearings and having parallel arms radiating therefrom, said arms being arranged in pairs. A wing or blade is mounted between the outer ends of each pair of arms, and each blade is provided with a locking device movably mounted on its arms and adapted when locking the blade to reinforce it throughout its height. Means are employed whereby these locking devices may be simultaneously disengaged from the wings or blades, so as to cause all of the blades to feather and the rotation of the shaft to stop.

The invention also consists of certain other novel features of construction and combinations of parts, which will be hereinafter more fully described, and pointed out in the claims.

In the accompanying drawings is shown the preferred form of the invention.

In said drawings, Figure 1 is a perspective view of the wheel. Fig. 2 is a plan view thereof. Fig. 3 is a front elevation of the wheel with the parts in the positions shown in Fig. 2, and Fig. 4 is an enlarged detail view of a pair of arms and showing a wing or blade locked in position therebetween.

Referring to the figures by characters of reference, 1 is a beam or other suitable supporting structure adapted to be placed over a flume or in any other convenient position, and extending through this beam is an upright shaft 2, the lower end of which has a socket 3, into which projects a stem 4, constituting the end bearing or guide for the shaft. This stem preferably projects from a base 5, which may be suitably anchored or secured within the bed of the stream in which the wheel is located. A disk 6 is mounted on the beam and surrounds the shaft, and this disk constitutes a race for a series of balls 7. A collar 8 is secured upon the shaft and bears on the balls 7, so that the entire weight of the wheel is supported thereby, and the same can therefore be rotated with very little power.

An upper and a lower series of arms 9 and 10, respectively, radiate from the shaft 2, the arms 9 being disposed directly above the arms 10 and corresponding therewith. The arms of the two series are held properly spaced apart by rings 11, which are bolted or otherwise rigidly fastened to them, and braces 12, having turnbuckles 12', are fastened to the outer ends of the upper arms and to the shaft 2. Each arm 9 is connected at its outer end to the end of the arm 10 thereunder by means of a rod 13. This rod constitutes a pivot on which are mounted eyes 14, preferably disposed adjacent one edge of a wing or blade 15, the height of which is slightly less than the distance between the two arms. The eyes 14 are held properly positioned on the rod 13 by means of collars 16 or other suitable stop devices upon the rod. It is of course understood that each pair of arms 9 and 10 is provided with one of these wings 15.

A lock or stay is provided for each of the wings or blades 15, and, as shown particularly in Fig. 4, this stay consists of a rod 17, having oppositely-disposed L-shaped arms 18 at its ends, which project above and below the arms 9 and 10, respectively, and are pivotally mounted within them. The points of connection between the arms 18 and the arms 9 and 10 are located at a distance from rod 13 greater than the width of the wing 15 on said rod, so that when the arms 18 are disposed at right angles to the arms 9 and 10 the rod 17 is held out of the path of said wing and the wing is free to rotate in a circle about this rod 13. A small guide or pulley 19 is arranged on each arm 9 between arm 18 and rod 13, and extending around this pulley or guide is a rope or cable 20, one end of which is fastened to the upper arm 18 adjacent the upper end of rod 17. The other end of this rope or cable extends under a pulley 21, mounted on arm 9 adjacent its inner end, and said cable is then fastened to a ring 22, which extends loosely around the shaft 2. It is of course understood that each of the arms 9 has a separate cable 20 thereon for operating the lock or stay connected to said arm and that all of these cables extend inward toward the shaft 2 and are fastened to the same ring 22. Operating-ropes 23 extend upward from opposite portions of the ring 22, so that the same can be conveniently raised.

It is believed that the operation of the wings 15 will be readily understood in view of the foregoing description when read in connection with the accompanying drawings.

When the ring 22 is pulled upward, all of the cables or ropes 20 will swing the rods 17 against the arms 9 and 10 and into the paths of the wings 15. If the current is in the direction indicated by the arrow in Fig. 2, the wings will successively swing into contact with these rods and present their broad faces to the current at one side of the shaft and will subsequently successively swing beyond the ends of and into alinement with the arms and will then feather as they move against the current. The force of the current upon the broad faces of the said wings will of course greatly exceed that upon the feathered wings at the opposite portion of the shaft, and therefore the wheel will rotate continuously in one direction. Should it be desired to stop the rotation of the wheel, the ring 22 is lowered, and the pressure of the current against that side of the wheel where the wings are feathered will throw the rods 17 out of the paths of the wings, so that before the wheel has made a complete rotation all of the blades or wings are freed of their stays and swing loosely in the direction of the current.

It is of course obvious that a single wing or blade 15 can be mounted between the arms 9 and 10 of each pair only when the radiating arms are disposed ninety degrees or more apart. Where a large number of arms 9 and 10 are used, as shown in the drawings, it is necessary to employ a plurality of wings or blades, so that practically the entire space between the arms of each pair can be closed. Where a number of blades are employed in connection with each pair of arms, the outer blade is mounted in the same manner as has been heretofore described, and the inner blades 24 and 25 are similarly mounted, but are of course much smaller, so as to be capable of swinging freely between the converging arms 9 and 10. The rod 26, on which the wings 24 are hung, are sufficiently removed from the rods 13 to permit the wings 15 to swing past them, and the rods 27 of the inner wings 25 are similarly located, so that the wings 24 can swing past them. A stay similar to the stay 17 is provided for each of these small wings 24 and 25, and the arms 29 of the stays are attached to the cables 20 by flexible connections 30, extending over pulleys 31. It is thus apparent that by raising the ring 22 the stays 28, as well as stays 17, will be swung into the paths of their respective wings, so as to cause them to present broad faces to the current at one side of the wheel. By lowering the ring 22 all of the stays will be swung from the paths of the wings, so as to cause the wheel to stop rotating, as described in connection with the operation of blade 15.

Although the inner blades 24 and 25 have been described as being provided with stays for the purpose of holding them against movement in one direction, these stays may be dispensed with, and in lieu thereof the inner blades or wings 25 may be caused to overlap the shaft 2, while the blades 24 will overlap the blades 25. It is of course obvious that with this construction the small blades can only be made to feather when at one side of the wheel. When the large blades 15 are released, however, only the small blades 24 and 25 at one side of the wheel will be presented to the current, and therefore sufficient resistance would not be offered to the current to cause the wheel to rotate and to drive any machinery which may be connected thereto.

It will be seen that the wheel is comparatively simple in construction and will rotate smoothly, requiring but little pressure to operate it. While the wheel is particularly designed to be entirely submerged, it will also operate if only partly submerged and is not necessarily actuated by a stream running in one direction, but will be rotated continuously in the same direction with ebb and flood tides. The device is therefore especially suitable in streams affected by the tides or by freshets. Although the wheel has been described as a "water-wheel," it will be understood that it can also be operated by wind-power.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. In a device of the character described the combination with a rotatable shaft, and upper and lower arms radiating therefrom; of wings pivotally mounted between the arms, an oscillatory stay device for each wing and adapted to be overlapped thereby, and means for simultaneously moving the stay devices into engagement with the wings.

2. In a device of the class described the combination with a rotatable shaft, and upper and lower arms radiating therefrom and arranged in pairs; of a wing pivotally mounted between the arms of each pair, an oscillating stay connected to each pair of arms, and means for moving the stays simultaneously into the paths of the wings.

3. In a device of the character described the combination with a rotatable shaft, and upper and lower arms radiating therefrom and arranged in pairs; of a wing pivotally connected to the arms of each pair and adapted to swing therebetween, a stay-rod for each wing, arms extending from the rods and pivoted to the respective radial arms, and means for simultaneously swinging the stays and their arms to bring said stays into the paths of the wings.

4. In a device of the character described the combination with a rotatable shaft, and upper and lower arms radiating therefrom and arranged in pairs; of a plurality of wings pivotally mounted between the arms of each pair, an oscillatory stay device for each wing, and means for simultaneously moving said devices into the paths of the wings.

5. In a device of the character described the combination with a rotatable shaft, and arms radiating from the shaft; of a plurality of wings pivotally connected to each arm, an oscillatory stay device for each wing, and means for simultaneously moving the stay devices into the paths of the wings to hold them against movement in one direction.

6. In a device of the character described the combination with a rotatable shaft, and arms radiating therefrom; of a plurality of wings pivotally connected to each of the arms, a stay device for each wing, said stays adapted to swing upon the arms, an actuating device slidably mounted on the shaft, and means connecting said device with the stays for simultaneously swinging said stays into the paths of the wings.

7. In a device of the character described the combination with a rotatable shaft, and arms radiating therefrom; of a plurality of wings pivotally connected to each arm, and oscillatory means carried by each arm and separate from the wings for holding one of the wings thereon against movement in one direction, and oscillatory means carried by each arm and separate from the wings for holding the other wings against movement in one direction.

In testimony that I claim the foregoing as my own I have hereto affixed my signature in the presence of two witnesses.

JOSEPH N. WHITNER.

Witnesses:
   E. HUME TALBERT,
   M. J. WARRINER.